United States Patent [19]

Lyons et al.

[11] Patent Number: 4,811,752

[45] Date of Patent: Mar. 14, 1989

[54] AUXILIARY REMOTE VALVE ACTUATOR

[75] Inventors: Jerry L. Lyons, St. Louis County; Keith Tayon, St. Louis, both of Mo.

[73] Assignee: Essex Industries, Inc., St. Louis, Mo.

[21] Appl. No.: 121,452

[22] Filed: Nov. 16, 1987

[51] Int. Cl.⁴ .............................................. F16K 17/38
[52] U.S. Cl. ...................................... 137/77; 251/294
[58] Field of Search ..................... 137/75, 77; 251/294

[56] References Cited

U.S. PATENT DOCUMENTS

| | | | |
|---|---|---|---|
| 3,165,236 | 1/1965 | Beazer | 137/77 X |
| 4,275,754 | 6/1981 | Lyons et al. | 137/75 |
| 4,310,012 | 1/1982 | Billington | 137/77 X |

Primary Examiner—Robert G. Nilson

Attorney, Agent, or Firm—Kalish & Gilster

[57] ABSTRACT

A remote valve actuator includes an elongated enclosure having a tension spring therein maintained in a tensioned condition by a releasable link which will separate in the event of fire or other exigency to release the tension in the spring. A cable extends between the enclosure and a rotary-actuated valve, where it is attached to a handle of other actuating means. A coupling within the enclosure couples force from the spring to the cable, for pulling of the cable to actuate the valve, upon release of the link. The cable can be of indefinite length to locate the auxiliary actuator some distance from the valve. Manual operation is also provided by the remote actuator.

8 Claims, 1 Drawing Sheet

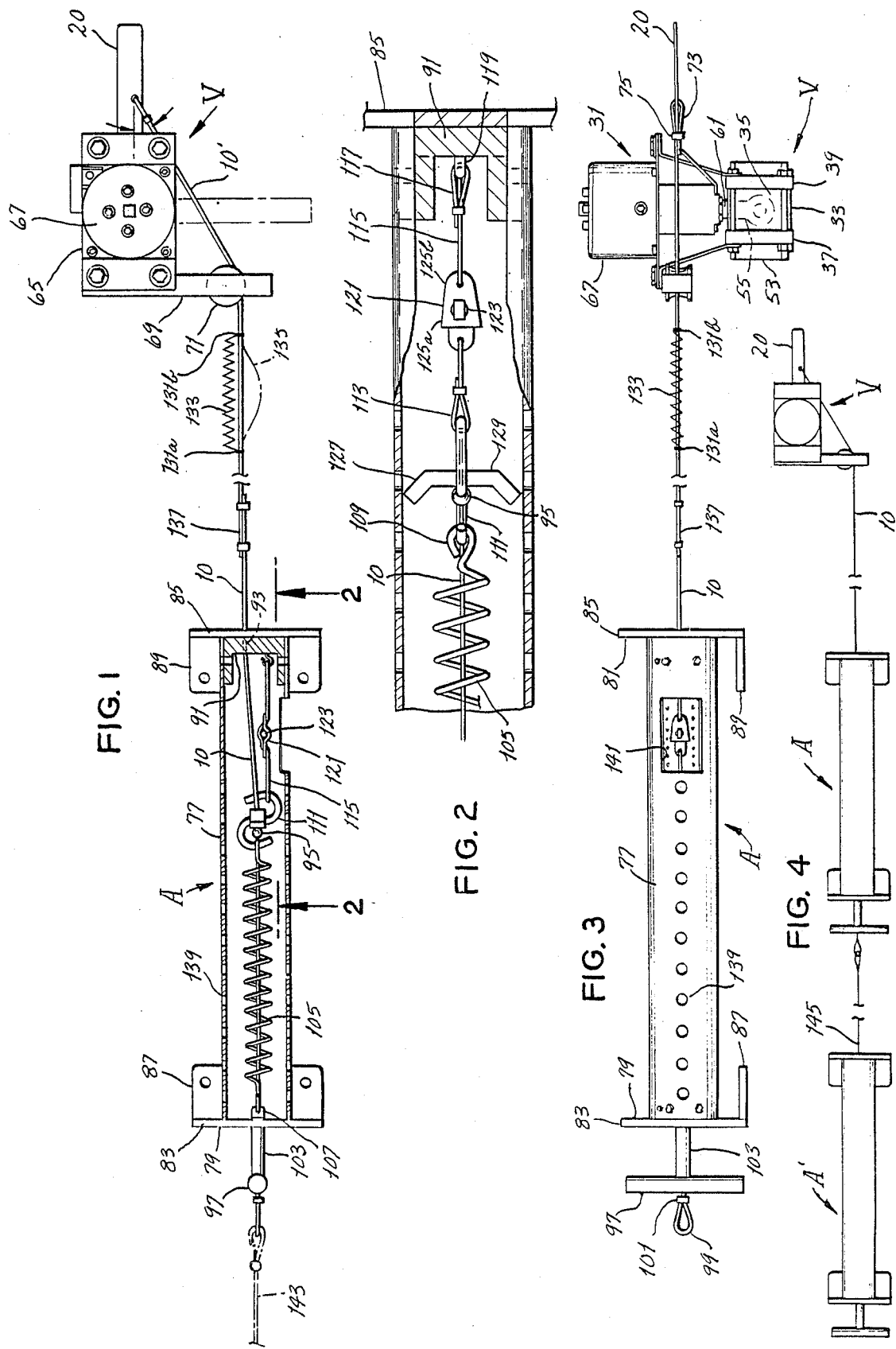

AUXILIARY REMOTE VALVE ACTUATOR

BACKGROUND AND SUMMARY OF THE INVENTION

The present invention relates to valve actuators, and more particularly, to an auxiliary actuator for operating a valve from a location remote from the valve and wherein the valve is itself of a type which is intended to operate automatically in response to the occurrence of an exigent character, such as fire, the auxiliary valve actuator providing also such actuation upon the same occurrence at the location of the auxiliary actuator as well as permitting manual actuation of the valve.

In Lyons U.S. Pat. No. 4,275,754, there is disclosed an automatic valve actuator of the type for actuating a rotary-actuated valve such as a ball valve, in the event of fire or other exigency. Such valves are used, for example, in the chemical industry for controlling the flow of various sorts of fluids, such as flammable volatiles. The valve actuator which includes a fusible link or other type of releasable link which can release the mechanism in the event of fire or other situation. For example, it may be electrically released. It may be desired, in the event of such an occurrence, that the valve either fail closed, in order to shut off the flow of fluid through the valve, or else to fail in an "as was" position. In any event, the valve is automatically actuated by such mechanism in order to return to a condition in which the valve should be for such an occurrence, whether it be fire, smoke, excessive heat or otherwise.

There are, however, many installations where it is necessary or desirable to provide for actuation of the valve from a remote location. Thus, an auxiliary actuator must be provided which itself is capable of actuating the otherwise automatically-actuated valve in order to close the valve (or return it to an "as was" status) in the event of an exigency such as fire. However, in such installations, the auxiliary actuator must not interfere with the normal actuating movement of the valve, whether such be manually effected or automatically carried out. Accordingly, the valve is to remain actuated either manually, or in response to its own built-in automatic actuator (as in accordance with said Lyons U.S. Pat. No. 4,275,754) or automatically in response to the operation of the auxiliary actuator.

Accordingly, an object of the invention is the provision of an auxiliary remote valve actuator for actuating a rotary valve, and specifically such an auxiliary actuator which may be used for actuating a valve of the type already equipped with an automatic valve actuator, but which also can be utilized with valves which do not have such an automatic valve actuator built in; which will permit auxiliary actuation of the valve from a location remote from the valve, whether separated by a relatively short distance or by a substantial distance; which permits not only auxiliary automatic actuation of the valve in response to an exigency such as fire, or the like, but also permits a remote manual actuation of the valve; which permits auxiliary actuation to be added to a rotary-actuated type of valve in numerous kinds of installations and which accordingly provides extremely facile operation without critical adjustment; which does not interfere with normal actuation, whether manual or automatic, of a valve with which it is interconnected; and which may be used with a variety of different types of valves, such as conventional rotary valves of the quarter-turn ball, butterfly or plug valve type, for automatic actuation thereof; and which permits still other types of actuation to be carried out, such as, for example, the addition of tandem auxiliary actuators along a single cable, or connection of such cable to other structures and devices, such as vehicles, for actuation of the valve.

It is also an object of the invention to provide such an auxiliary remote valve actuator which complies with occupational safety and health requirements, which is inherently safe and reliable in operation; and which, in addition to relative simplicity and economy of construction requiring relatively few parts and simple manufacture, it is entirely durable, long-lasting and reliable in operation.

Other objects will be apparent and in part pointed out hereinbelow.

BRIEF DESCRIPTION OF THE DRAWINGS

FIG. 1 is a top plan view of an auxiliary remote valve actuator in accordance with and embodying the present invention, as shown interconnected with a rotary actuated valve having an automatic valve actuator, and with portions of the auxiliary remote actuator being horizontally sectioned.

FIG. 2 is an enlarged partial horizontal cross-section of the remote valve actuator of FIG. 1.

FIG. 3 is a side elevation view of the apparatus of FIG. 1.

FIG. 4 is a simplified schematic diagram of a system utilizing multiple auxiliary remote actuators of the invention for operating a valve to which they are connected by a single cable.

Corresponding reference characters indicate corresponding parts throughout the several views of the drawing.

DESCRIPTION OF THE PREFERRED EMBODIMENTS

Referring to FIG. 1, designated at A is a remote valve actuator for actuating a rotary-actuated valve generally designated V. Actuator A is connected to valve V from a location remote from the valve by a cable 10 having one end secured to a handle 20 for manual actuation of the valve. Valve V is of a known type such as a quarter-turn ball type, although it could be one of various other rotary-actuated valves such as butterfly or plug valves. Referring to FIG. 3, valve V is shown to be already provided with an automatic actuator assembly designated generally at 31. The actuator assembly may be of the construction shown and described in Lyons et al U.S. Pat. No. 4,275,754. Such an actuator includes a spring wound within a housing of the actuator for causing the operating shaft 61 of the valve to be rotated 90° in the event of a fire or other exigency causing melting of a fusible link (not shown) or other release linkage.

Valve V comprises a body 33 constituted by a center section 35 of generally cylindrical cross section, clamped between two generally rectangular end sections of a flanged nature 37 and 39. Said end flanges 37, 39 are clamped tightly to center section 35 of the valve by bolts and nuts. Each of the flanged end sections 37, 39 has a respective collar 51, 53 extending outwardly thereof. Each such collar has a cylindrical outer surface and is internally threaded in suitable manner for connection of pipe or other fluid conduit thereto. As will be understood, one of collars 51, 53 provides an inlet to the valve and the other an outlet. Said inlet and outlet are connected by an axial passage through center section 35 of the valve. Located in such passage is a valve element which, as illustrated, is a ball type element as designated at 55.

The ball valve element 55 is journalled for rotation in center section 35 of the valve, there being a shaft 61 extended upwardly through the valve center section for rotation of the ball valve element 55. With rotation of shaft 61, valve element 55 is rotated to provide for alignment of the axis of bore 5 either transverse to the valve assembly, or in line with the inlet and outlet openings provided by collars 51 and 53. Operating handle 20 is secured to said shaft, such as through a lost motion coupling, for actuation thereof. Actuating assembly 31 is secured to the valve by appropriate bracketing mountings for coupling rotational force to shaft 61 independently of handle 20. Merely as an illustration of a mounting arrangement, a securement element 65 of plate-like shape is shown, there being a housing 67 of the actuator which extends upwardly therefrom or containing the actuating spring of actuator assembly 31. Said spring will be coiled and maintained in a wound condition of readiness for automatic actuation. Fastened to plate 65 by suitable bolting or other fastening means is a bracket arm 69 carrying a housing and a pulley 71 of which passes cable 10 so that said cable includes reach 10' connected to handle 20 by forming a bight 73 secured by a swage 75, such that reach 10' forms an angle with the handle of about 30°–40°. Thus, when the handle is swung 90° to the position shown in phantom, reach 10' will be generally aligned with the access of the main portion of cable 10.

As will thus be understood from FIG. 1, actuator A is intended to automatically cause actuation of valve V by repositioning handle 20 to the position shown in phantom in FIG. 1, whenever there is an occurrence of a condition causing operation of actuator A. Such actuation may effect closing of the valve.

Actuator A includes a barrel 77 carrying brackets 79, 81 at its respective outer and inner ends. These brackets are of L-shaped character to include respective upright portions 83, 85 and corresponding base portions 87, 89, providing mounting of barrel 77 at a location remote from valve V.

The distance between actuator A and valve V is indefinite, and may be, for example, tens or even hundreds of meters away. An illustration of usage, valve V may be utilized for the control of a volatile fuel at one location of a fueling facility while actuator A may be located at another area of the facility such as in the region of a loading area where a fueling truck may be stationed for delivery of fuel, and at which remote location it is desired to provide for detection of a fire or other dangerous condition and, in that event, to actuate valve V, independently of whether or not its own actuator 31 has been operated by the condition affecting actuator A.

At the inner end of barrel 77, there is provided an inner end ca 91 of relatively massive character for securement of various components including the upright flange member 85. Cable 10 passes through an opening 93 therein for extending into the interior of barrel 77, wherein it is provided with a ball-type swage 95 for purposes presently appearing and thence extends toward the outer end of the barrel and through a keyshaped handle 97 to provide an outer loop-forming bight 99 secured by a swage 101 for a purpose explained later. Handle 97 has a collar or stem 103 through which the cable so extends, there being a suitable opening centrally of bracket member 83 for receiving the cable and proximal portion of collar 103.

Within barrel 77 is provided a coiled spring 105 of tension type, cable 10 passing through the center of the spring. The outer end of spring 105 is attached to a suitable anchor 107, the inner end forming a bite 109 through which is extended one end thereof an S-hook 111. The other end of the S-hook extends through a bight of a cable 115 having an inner end bight 117 connected to a suitable anchor 119 in turn secured to inner end cap 91 (FIG. 2) Located centrally within cable 115 is a fusible link 121 of a known type including a fusible element 123 which secures together opposite end portions 125a, 125b of the link. The link is adapted to separate in response to insert C. Link portions 125a, 125b are each of a thin, flat material, each having an aperture as indicated for permitting tensile force to be applied to the link for causing separation thereof when said element 123 fuses in response to a predetermined temperature in the environment surrounding the link.

However, it is possible for the releasable link 121 to be of electrically actuated type as, for example, of the configuration shown in FIG. 22 of aforesaid Lyons et al U.S. Pat. No. 4,275,754, such as for actuation in response to various remotely sensed conditions, such as smoke, heat, various emergency conditions, or any other condition of an exigent character requiring automatic operation of valve V.

Accordingly, link 121, while intact, will maintain spring 105 in tensioned condition. Fitted on cable 10 inwardly of ball swage 95 is an approximately C-shaped yoke 127 which extends across S-hook 111. The cable passes through an aperture 129 of bracket 127. Accordingly, upon release of link 121 by fusing of element 123, spring 105 will cause bracket- 127 to be pulled toward the outer end of the barrel and consequently to engage ball swage 95 for drawing cable 10 into barrel 10 with consequent swinging rotation of handle 20 to the position shown in phantom in FIG. 1.

Cable 10 may include fittings 131a, 131b spaced apart along its length for attachment of the opposite ends relatively light spring 133 of tension type. Spring 133 will thereby permit cable 10 to form a loop or bight 135 in the event that handle 20 is manually swung to the position shown in phantom for keeping the cable generally in alignment upon such manual actuation.

Cable 10 need not be of a single length, but may instead be of separate spliced together as indicated at 137.

Barrel 77 is preferably provided with apertures as shown at 139 along its length and includes also a relatively larger aperture 141 of rectangular window-like character for accessibility for link 121.

Referring to FIG. 1, the loop formed by bight 99 can be used for connection to the cable of an extrinsic actuating device. For example, in a fueling installation, a cable at 143 can be connected as by snap link to bight 99, such as might, for example, be connected to a fueling truck and while a fueling operation takes place. However, if through inadvertence the driver should attempt to pull away without having disconnected the fuel lines and the associated cable 143, cable 143 will pull on cable 10 and thereby cause shut-off actuation of valve V.

As shown in FIG. 4, a further auxiliary valve actuator A' can be provided at a location remote from the first valve actuator A and attached by a cable 145. This illustrates the potential for linking together in series a plurality of the new auxiliary actuators, any one of which can respond to fire or other occurrence for actuating valve V.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. For use with a valve having a valve actuating means for actuating the valve by externally-effected movement of the actuating means, an auxiliary remote actuator for automatically activating means, comprising a cable having an inner end for connection to the valve actuating means, for actuation of the valve by pulling of the cable, a housing for receiving the other, outer end of the cable, the housing forming a longitudinally elongated barrel, an actuating spring within the housing, the spring being of coiled tension type extending longitudinally within the barrel and having inner and outer ends, the outer spring end being secured within the barrel, a releasable link within the housing for maintaining the spring in a tensioned condition and operative for releasing the spring in response to fire or other exigency, the spring inner end being connected to the releasable link for maintaining the spring in elongated, tensioned condition within the barrel, the outer end of the cable including means for permitting external actuation of the valve by pulling of the cable, means for transferring force from the spring for pulling the cable, the cable extending centrally through the barrel along the length of the barrel from an inner end receiving the cable and through a central space of the spring extending along the length of the cable within the barrel, the means for transferring force from the spring including an engagement member affixed to the inner end of the spring for applying force therefrom to the engagement means upon releasing of the releasable link, and means for mounting of the housing at a location remote from the valve with the cable extending between the enclosure and the valve actuating means.

2. An auxiliary remote valve actuator according to claim 1 wherein the engagement means comprises a stop swaged on the cable, and the engagement member comprises a yoke contacting the stop.

3. An auxiliary remote valve actuator according to claim 1 wherein the releasable link is carried by a further cable having an inner end anchored within the barrel and an outer end connected to the inner end of the spring.

4. An auxiliary remote valve actuator according to claim 3 wherein the barrel includes apertures along its length, including an aperture for access to the releasable link.

5. An auxiliary remote valve actuator according to claim 1 wherein the means for permitting external actuation of the cable comprises a handle at the outer end of the barrel and connected to the cable for permitting manual activation by manual pulling of the cable.

6. An auxiliary remote valve actuator according to claim 5 wherein the outer end of the cable forms a loop extending externally of the barrel beyond the handle for attachment of further actuating means.

7. An auxiliary remote valve actuator according to claim 1 wherein the valve is of rotary-activated type including an automatic actuator for automatically rotating an activating shaft of the valve, the valve including a manual actuation area for manually rotating the shaft, the inner end of the cable being connected to the manual activation arm.

8. For use with a valve having a valve actuating means for actuating the valve by externally-effected movement of the actuating means, an auxiliary remote actuator for automatically activating means, comprising a cable having an inner end for connection to the valve actuating means, for actuation of the valve by pulling of the cable, a housing for receiving the other, outer end of the cable, the housing forming a longitudinally elongated barrel, an actuating spring within the housing, the spring being of coiled tension type extending longitudinally within the barrel and having inner and outer ends, the outer spring end being secured within the barrel, a releasable link within the housing for maintaining the spring in a tensioned condition and operative for releasing the spring in response to fire or other exigency, the spring inner end being connected to the releasable link for maintaining the spring in elongated, tensioned condition within the barrel, the outer end of the cable including means for permitting external actuation of the valve by pulling of the cable, means for transferring force from the spring for pulling the cable, the cable extending centrally through the barrel along the length of the barrel from an inner end receiving the cable to an outer end of the barrel, the releasable link being carried by a further cable having an inner end anchored within the barrel and an outer end connected to the inner end of the spring, the means for transferring force from the spring including an engagement member affixed to the inner end of the spring for applying force therefrom to the engagement means upon releasing of the releasable link, and means for mounting of the housing at a location remote from the valve with the cable extending between the enclosure and the valve actuating means.

* * * * *